April 30, 1935.   J. C. STONG ET AL   1,999,644
RINGLESS SLEEVE PISTON
Filed Jan. 20, 1933
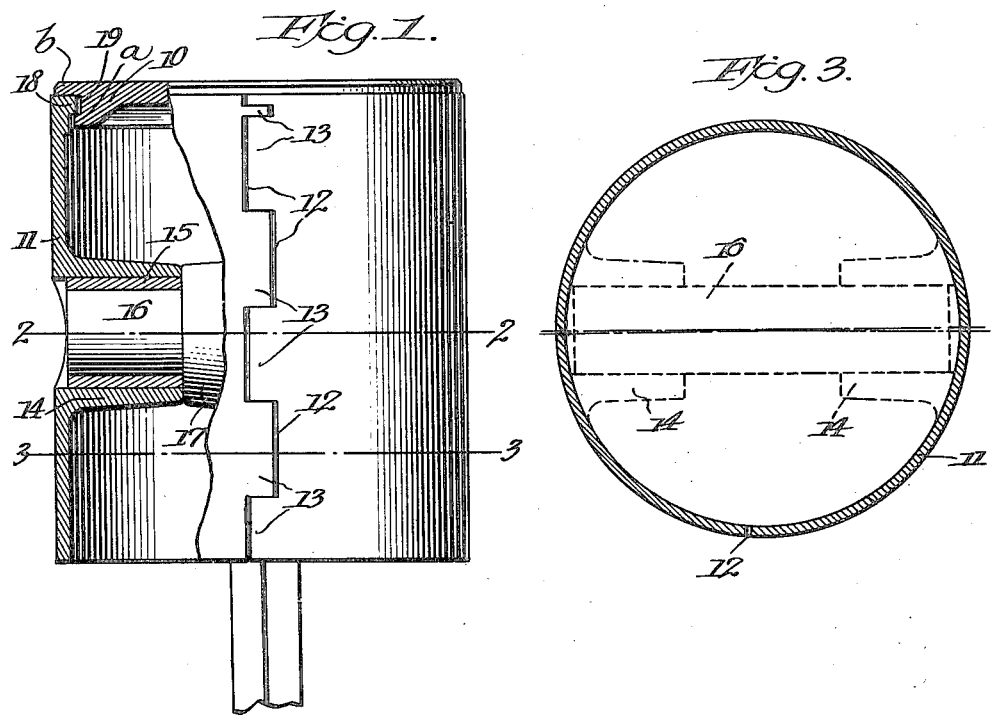
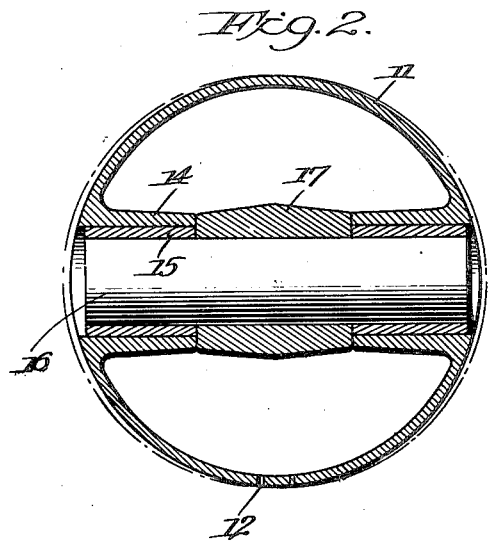
Inventors
John C. Stong
Joseph W. Peterson
By
Attorney Patented Apr. 30, 1935

1,999,644

UNITED STATES PATENT OFFICE 1,999,644

RINGLESS SLEEVE PISTON

John C. Stong and Joseph W. Peterson, Muskegon, Mich.

Application January 20, 1933, Serial No. 652,733

2 Claims. (Cl. 309—15)

The present invention is a piston construction adapted for use in connection with engines, pumps, or for any purpose where a reciprocating piston is employed.

So far as is known, reciprocating pistons now in use comprise a head having a downwardly extending cylindrical skirt, the head as well as the skirt portion being provided with annular grooves on its outer surface, in which are fitted expansible rings to form a tight fit or joint with the sidewalls of the cylinder in which the piston operates. It has also been proposed to make up the piston by a plurality of sectional members which form a skirt or a shell enclosing piston proper and which sections are expanded outwardly of the piston against the walls of the cylinder by rings, springs, or the like.

The latter, or sectional, type of piston is generally objectionable, and among some of the objections are:—The difficulty in assembling and inserting in the cylinder; the greater cost to manufacture; the sections becoming loose; and its altogether too complicated construction.

The object of the present invention is to overcome all of the disadvantages above enumerated, as well as to provide an improved piston having a maximum of two parts, a head and a skirt, the skirt having no rings, but forming a tight fit with the cylinder wall so as to prevent leakage of compression, and power as well as oil leaks.

Another object of the invention is the provision of a piston of the above stated construction where wrist pin noises and piston "slaps" are avoided or overcome.

Another object of the invention is the provision of a piston which comprises a unitary cylindrical skirt split in a general longitudinal direction and the wrist pin bearings being provided wholly in the skirt.

Another object of the invention is the provision of a piston having a cylindrical unitary skirt split longitudinally at one point from end to end and possessing a certain degree of resiliency, the split edges of the skirt being formed with overlapping projecting portions to form an expansible gas tight joint, and a solid head for the skirt having a connection therewith that will permit an expansion of the head, due to heat conditions, independently of the skirt.

Another object of the invention is the provision of a piston having a cylindrical unitary skirt split longitudinally at one point from end to end and possessing a certain degree of resiliency, the split edges of the skirt being formed with overlapping projecting portions to form an expansible gas tight joint, a wrist pin bearing being formed in or carried by the skirt along and so positioned and fitted that when the piston is being operated and expands due to heat conditions, the wrist pin bearing will prevent wrist pin knocks or noises due to wear.

With the above and other objects in view, some of which will be obvious and others later referred to, the invention further resides in the sundry details of construction, combination and arrangement of parts hereinafter more fully described and pointed out in the appended claims.

In the drawing, which illustrates the invention, in one of its embodiments:—

Figure 1 is a side elevation with parts broken away and shown in section to illustrate details of construction;

Figure 2 is a transverse sectional view of the piston taken on line 2—2 of Figure 1;

Figure 3 is a diagrammatic view of the skirt showing the normal position of the parts with .004 normal clearance gap and also illustrating the position of the parts when in expanded position under operating conditions wherein the skirt expands to form a tight self-adjusting sliding fit with the walls of the cylinder, and which causes a relative movement of the wrist pin bearings to take up the wear between them and the wrist pin to avoid wrist pin knocks.

Referring in detail to the drawing, it will be seen that the piston proper consists of two elements, i. e., a head 10 and a skirt 11.

The skirt 11 is a unitary cylindrical sleeve, or substantially cylindrical, split longitudinally, as at 12, from end to end so that the skirt may expand and contract laterally, due to heat or working conditions. The split edges 12 of the skirt are preferably formed with alternating and overlapping projections 13 to provide a close fit at the joint between the split edges 12. This joint may be formed in any manner which will permit circumferential expansion and contraction of the skirt, and still be gas or leak proof to the extent of holding the compression or preventing passage of oil thereby. Therefore, in effect, the skirt 12 is an enlarged or longitudinally extended split piston ring.

Provided in the walls of the skirt are a pair of apertures or bosses 14 diametrically positioned, preferably about mid-way between the ends thereof and spaced equally on opposite sides of the split 12.

These apertures or bosses 14, as the case may be, receive therein bearings 15, in which latter the end portions of the wrist pin 16 are mounted for rotation or oscillation, and fast upon which is the connecting or piston rod 17.

The upper end portion of the skirt 11 is formed with an inwardly extending circumferential flange 18 which, of course, is split at 12, as is the remainder of the skirt.

The piston head 10 is substantially disc-like and has a diameter slightly less than the normal diameter of the skirt and, further, has a circumferential annular groove 19, in which the flange 18 of said skirt fits and interlocks, thus holding the head 10 and the skirt 11 together. The inner wall a of the groove 19 is shorter than the outer wall b overlying the upper edge of the skirt, but is of slightly less diameter than the normal diameter of the skirt.

This construction permits the skirt to expand and contract relatively to the head due to heat or other working conditions without leakage of compression and the passage of oil. Of course, several flanges 18 and grooves 19 may be provided, if conditions require. To assemble the head 10 and the skirt 11, the skirt is expanded, as shown in dotted lines of Figure 2.

The construction of the piston, according to the present invention, eliminates piston slaps and wrist pin knocks because of the action of the skirt under operating conditions. The skirt 11 forms a ringless sleeve self-expanding throughout its entire length tightly engaging the surface of the cylinder throughout its entire length, or such portion of the surface area of the skirt as may be desired, and which can be controlled by the surface design of the skirt. Thus, it will be understood that at all times the skirt will tightly fit the sidewalls of the cylinder and will expand and adjust itself according to the wear either on the cylinder wall or on the surface of the skirt. This same adjustment or movement due to expansion or contraction of the unitary split cylindrical skirt and a disposition of the bosses 14 therein effects a slight lateral movement of the bosses so as to cause the bearings 15 to snugly contact the surfaces of the wrist pin and thereby insuring that the wrist pin will be kept tight in the bearings until all of the parts have become worn to the extent where the entire piston has lost its usefulness.

However, experimentation has demonstrated that pistons constructed in accordance with the present invention have not developed piston slaps or wrist pin knocks long after they have been developed in pistons of usual construction.

As to the method now employed in assembling the wrist pins, the bosses 14 are bored or otherwise perforated, while the piston has been drawn up tightly to the position it would assume when running for a length of time and subject to heat, or working conditions. Then the bearings 15 and the wrist pin 16 are fitted in the bosses so that the pin will have a snug but easy and smooth running fit in the bearings. The piston is then inserted in the cylinder of the engine and expands to tightly fit the sidewalls thereof, this expansion being such as to provide the usual gap at the split 12 of the skirt, which opens at about .004 of an inch to provide the normal clearance for expansion of the unitary split cylindrical skirt. As the engine starts running and heating up, the gap at the split edges 12 of the skirt gradually closes, due to the expansion of the skirt. As the piston operates, over a period of time, there will be a certain amount of wear on the walls of the cylinder, the surface of the skirt and between the bearings 15 and the wrist pin 16. This will permit the skirt to expand further, opening the gap between the split edges 12 of the skirt wider than before. This will tend to cause a slight lateral shifting movement of the bosses, which in turn causes the bearings to tightly contact with the wrist pin at least on one side thereof.

From the foregoing, it will be seen that a piston has been provided for any type of engineering where pistons are used and which will definitely eliminate piston slaps and other noises due to loose and worn parts, as well as wrist pin knocks, and offers a motor that runs equally well when normally or unusually hot and also a smoother running motor than has been heretofore produced. The piston of the present invention, because of its simple construction, will have a greatly reduced manufacturing cost, and does away entirely with the cost of piston rings, as the skirt itself is a self-adjusting piston ring.

In this specification and the annexed drawing, the invention is disclosed in the form in which it is considered to be the best, but the invention is not limited to such form because it is capable of being embodied in other forms; and it is to be understood that in and by the claims following the description herein it is intended to cover the invention in whatever form it may embody within the scope thereof.

Having thus described the invention, what is claimed as new is:

1. A piston consisting of a head and a single walled cylindrical skirt portion having a longitudinal slit throughout its length and arranged approximately parallel with the axis of the skirt portion, said skirt portion and said slit being provided with overlapping projections providing a close-fit joint, said skirt portion also having rigid wrist-pin bosses oppositely disposed with respect to each other and extended radially inwardly from positions which are approximately equally spaced with respect to, and on opposite sides of, said slit, in such manner that at all times approximately the same extent of lateral movement is imparted to said bosses during expansion and contraction of the skirt member, said skirt portion and said head being normally connected by a loose-fit joint.

2. A piston consisting of a single walled cylindrical skirt portion of approximately uniform thickness throughout, said skirt portion having a slit extending longitudinally thereof throughout its length and approximately parallel with the axis thereof, said skirt portion and said slit being provided with overlapping lateral portions so constructed and arranged as to provide a close-fit joint, said skirt portion being provided with integral rigid wrist-pin bosses oppositely disposed with respect to each other and extended radially inwardly from positions which are approximately equally spaced with respect to and on opposite sides of said slit, in such manner that at all times approximately the same extent of lateral movement is imparted to said bosses during expansion and contraction of the skirt member, and a disk-like head portion, the upper end of said skirt and said head portion having complemental interconnected rib and groove connections so constructed and arranged as to permit expansion and contraction of the skirt portion with respect to the head portion.

JOHN C. STONG.
JOSEPH W. PETERSON.